Patented Dec. 25, 1923.

1,478,738

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

WELDING ELECTRODE.

No Drawing.     Application filed May 22, 1922. Serial No. 562,818.

*To all whom it may concern:*

Be it known that I, CLAUDE J. HOLSLAG, a citizen of the United States, residing at South Orange, in the county of Essex, State of New Jersey, have invented certain new and useful Improvements in Welding Electrodes, of which the following is a description.

This invention relates to an electrode used for welding purposes, electric arc welding in particular, and the electrode is especially adapted for use in welding or repairing parts where increased strength and tough-hardness is desirable.

It has been proposed heretofore to use as electrodes for this class of work rods containing considerable manganese, in addition to the other ingredients usually found in steel, such as iron, carbon, silicon, sulphur and phosphorus. Nickel has also been proposed in combination with the above mentioned ingredients as a welding rod for use with the oxy-acetylene blow type.

While in the ordinary mild steel electrode having a low content of carbon such elements as manganese, silicon, sulphur and phosphorus are not particularly objectionable; yet, in my welding electrode, I have found it to be an advantage to keep the sulphur and phosphorus low, for example less than .035. Manganese and silicon are found to be desirable up to the amounts ordinarily met with in mild steel electrodes. However, I have found that the use of considerable manganese for the class of service referred to above is open to many objections and where nickel is used instead of manganese, I have discovered there is a considerable tendency for the weld to be interlaced with fine cracks, but by the addition of chromium these cracks are entirely eliminated and a clean deposit is obtained, and a very high tensile strength, yet a deposit which can be machined but is tough-hard.

By way of illustration, but not of limitation, on certain classes of work I have obtained most excellent results by the use of ½ to 2½ per cent chromium with nickel between 1 and 4 per cent and carbon .4 to .6 per cent with the small amount of manganese, silicon, sulphur and phosphorus which are ordinarily present in alloy steels.

For certain classes of work, I may use in the preparation of the electrode, a small amount of vanadium which acts as a scavenger.

It will be understood that I may use my improved welding electrode either bare or with any suitable covering, such for example as disclosed in my patent application 258,197, filed October 15, 1918, also it will be evident to one skilled in the use of metals that the composition of the welding electrode may be varied over a wide limit to meet various conditions without departing from the spirit of my invention and the scope of the appended claims.

Having thus described my invention, what I claim is:

1. A welding electrode comprising an alloy of steel containing nickel and chromium, the latter, in such proportion as to prevent cracking of the deposited metal on cooling.

2. A welding electrode comprising an alloy of steel containing nickel and a metal to prevent the deposited metal from developing cracks in cooling.

3. A welding electrode comprising an alloy of steel containing nickel and chromium, the nickel being in excess of chromium.

4. A welding electrode comprising an alloy of steel containing nickel and a metal to prevent the deposited metal from developing cracks in cooling, the amount of nickel being in excess of the crack preventing metal.

5. A welding electrode comprising an alloy of steel containing nickel, chromium and vanadium.

6. A welding electrode comprising an alloy of steel containing chromium, vanadium and nickel, the nickel being in excess of the chromium and vanadium.

7. A welding electrode comprising a steel alloy containing .4 to .6 per cent carbon, 3¼ to ¾ per cent nickel and ½ to 2½ per cent chromium.

8. The method of electric arc welding which consists in passing welding metal across an arc from an electrode containing nickel and chromium, the latter, in such proportion as to prevent cracking of the deposited metal on cooling.

9. The method of electric arc welding which consists in passing welding metal across an arc from a covered electrode containing nickel and chromium, the latter, in such proportion as to prevent cracking of the deposited metal on cooling.

10. The method of electric arc welding which consists in passing welding metal across an arc from an electrode containing nickel, chromium and vanadium.

11. The method of electric arc welding which consists in passing welding metal across an arc from a covered electrode containing nickel, chromium and vanadium.

12. A welding electrode comprising a steel alloy containing chromium, the latter, in such proportion as to prevent cracking of the deposited metal on cooling.

13. A welding electrode comprising a steel alloy containing ½ to 2½ per cent chromium.

In testimony whereof, I affix my signature.

CLAUDE J. HOLSLAG.